US012802703B2

(12) United States Patent
Atkinson

(10) Patent No.: US 12,802,703 B2
(45) Date of Patent: Nov. 17, 2026

(54) NOISE CANCELLATION FOR ELECTRONIC DEVICES

(71) Applicant: Hewlett-Packard Development Company, L.P., Spring, TX (US)

(72) Inventor: Lee Warren Atkinson, Taipei City (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 155 days.

(21) Appl. No.: 18/716,023

(22) PCT Filed: Dec. 13, 2021

(86) PCT No.: PCT/US2021/063124

§ 371 (c)(1),
(2) Date: Jun. 3, 2024

(87) PCT Pub. No.: WO2023/113771

PCT Pub. Date: Jun. 22, 2023

(65) Prior Publication Data

US 2025/0037731 A1 Jan. 30, 2025

(51) Int. Cl.
*G10L 21/0232* (2013.01)
*G06T 7/20* (2017.01)
(Continued)

(52) U.S. Cl.
CPC ............ *G10L 21/0232* (2013.01); *G06T 7/20* (2013.01); *G06T 7/70* (2017.01); *G06V 20/41* (2022.01);
(Continued)

(58) Field of Classification Search
CPC . G10L 21/0232; G10L 25/57; G10L 21/0216; G06T 7/20; G06T 7/70;
(Continued)

(56) References Cited

U.S. PATENT DOCUMENTS 6,657,676 B1 * 12/2003 Borneo .................... G06T 5/20
375/E7.193
9,293,151 B2 3/2016 Herbig et al.
(Continued)

FOREIGN PATENT DOCUMENTS

EP 3683774 A1 7/2020

OTHER PUBLICATIONS

FaceTime on iOS 15: See ALL the new features revealed, available at <https://www.youtube.com/watch?v=1GZy3YBi7h4>, Jun. 7, 2021, 3 pages.

(Continued)

*Primary Examiner* — Athar N Pasha
(74) *Attorney, Agent, or Firm* — Quarles & Brady LLP

(57) ABSTRACT

In some examples, an electronic device includes a processor. In some examples, the processor performs a first noise cancellation on a video stream using a first noise canceller characteristic. In some examples, the processor detects a change in an object salience in the video stream. In some examples, the processor performs a second noise cancellation on the video stream using a second noise canceller characteristic based on the change in the object salience.

20 Claims, 8 Drawing Sheets

(51) Int. Cl.
*G06T 7/70* (2017.01)
*G06V 20/40* (2022.01)
*G06V 40/16* (2022.01)
*G10L 25/57* (2013.01)

(52) U.S. Cl.
CPC ............ *G06V 40/161* (2022.01); *G10L 25/57* (2013.01); *G06T 2207/10016* (2013.01); *G06T 2207/30196* (2013.01)

(58) Field of Classification Search
CPC ........... G06T 2207/10016; G06T 2207/30196; G06V 20/41; G06V 40/161; G06F 3/167
See application file for complete search history.

(56) References Cited

U.S. PATENT DOCUMENTS

| | | | | |
|---|---|---|---|---|
| 9,767,828 | B1 | 9/2017 | Velusamy et al. | |
| 10,622,009 | B1 | 4/2020 | Zhang et al. | |
| 10,643,303 | B1 * | 5/2020 | Cotoros | G06T 3/16 |
| 2008/0189613 | A1 * | 8/2008 | Jong | G06F 3/0488 715/716 |
| 2009/0245571 | A1 * | 10/2009 | Chien | G06V 10/28 382/103 |
| 2009/0304088 | A1 * | 12/2009 | Kodaka | H04N 5/147 375/E7.027 |
| 2010/0309284 | A1 * | 12/2010 | Samadani | H04N 7/15 348/E7.083 |
| 2011/0235994 | A1 * | 9/2011 | Xu | G11B 27/28 386/E5.003 |
| 2013/0141643 | A1 * | 6/2013 | Carson | H04N 21/43072 348/515 |
| 2014/0241702 | A1 * | 8/2014 | Solbach | H04N 21/4318 386/285 |
| 2014/0286625 | A1 * | 9/2014 | Matsubara | G11B 27/00 386/278 |
| 2015/0002740 | A1 * | 1/2015 | Yanagihara | H04N 21/4318 348/515 |
| 2016/0086345 | A1 * | 3/2016 | Kuo | H04N 23/45 348/47 |
| 2016/0309081 | A1 * | 10/2016 | Frahm | G06F 3/013 |
| 2017/0034568 | A1 * | 2/2017 | Suzuki | H04N 5/60 |
| 2017/0264934 | A1 * | 9/2017 | Guo | H04N 21/8547 |
| 2017/0364752 | A1 * | 12/2017 | Zhou | G06V 10/462 |
| 2017/0372697 | A1 * | 12/2017 | Cheatham, III | H04L 65/403 |
| 2018/0089512 | A1 | 3/2018 | Träff | |
| 2018/0158446 | A1 * | 6/2018 | Miyamoto | H04R 1/406 |
| 2019/0076741 | A1 * | 3/2019 | Thompson | A63F 13/35 |
| 2020/0053395 | A1 * | 2/2020 | Mukaiyama | G06F 13/00 |
| 2020/0202161 | A1 | 6/2020 | Kondo et al. | |
| 2020/0409455 | A1 * | 12/2020 | Wilson | G06T 19/20 |
| 2021/0044896 | A1 * | 2/2021 | Kim | H03F 3/183 |
| 2021/0193155 | A1 * | 6/2021 | Mitchell | H04N 1/00395 |
| 2021/0319809 | A1 * | 10/2021 | Lin | G10L 21/0208 |
| 2021/0365707 | A1 * | 11/2021 | Mao | G06N 3/084 |
| 2022/0068248 | A1 * | 3/2022 | Zhang | G06F 16/63 |
| 2024/0296696 | A1 * | 9/2024 | Takagi | G06V 20/52 |

OTHER PUBLICATIONS iOS 15 Voice Isolation Tests: Game-Changer Noise Cancellation for Calls, available at <https://www.youtube.com/watch?v=gz66BFK04ss>, Sep. 9, 2021, 3 pages.

* cited by examiner

NOISE CANCELLATION FOR ELECTRONIC DEVICES

BACKGROUND

Electronic technology has advanced to become virtually ubiquitous in society and has been used for many activities in society. For example, electronic devices are used to perform a variety of tasks, including work activities, communication, research, and entertainment. Different varieties of electronic circuitry may be utilized to provide different varieties of electronic technology.

DETAILED DESCRIPTION

Figure 1:
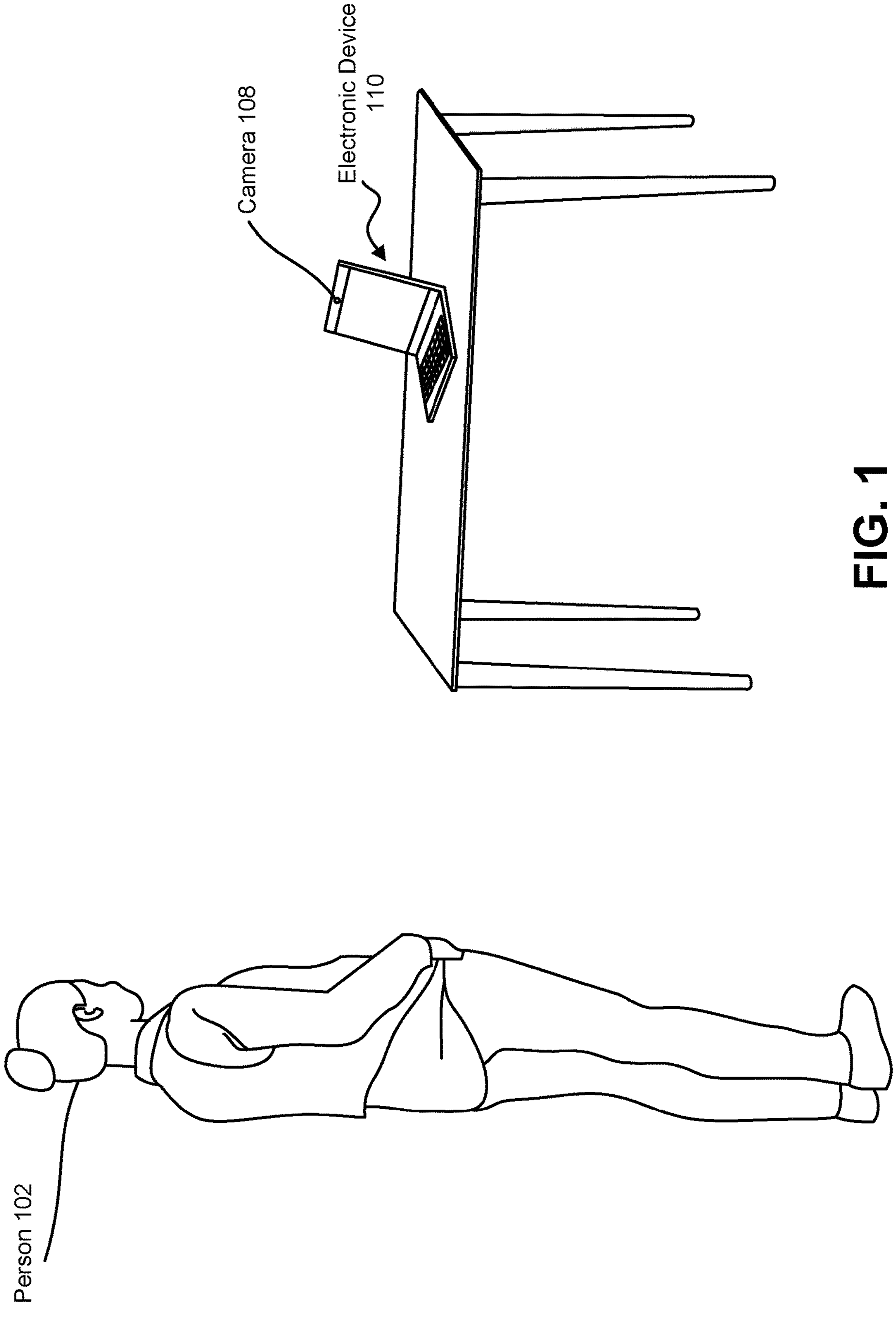
FIG. 1 is a diagram illustrating an example of noise cancellation for electronic devices.

An electronic device is a device that includes electronic circuitry. For instance, an electronic device includes integrated circuitry (e.g., transistors, digital logic, semiconductor technology, etc.). Some examples of electronic devices include computing devices, laptop computers, desktop computers, and smartphones.

In some examples, an electronic device may have or be connected to a camera for capturing images or video. For example, the camera may be a built-in camera(s) or an external camera (e.g., web camera (webcam)). In some examples, the camera is a user-facing camera used for capturing digital images, video, video conferencing and/or other applications.

When recording video, streaming video, participating in a video conference, etc., noise cancellation may be used to cancel or filter out background noise. In some examples, a noise canceller is used to adaptively filter out non-human sounds. For example, the noise canceller is used to filter out noises such as a barking dog or a police siren from the audio portion of the video.

In some scenarios, a user may not want certain sounds to be cancelled by the noise canceller. For example, if a person is playing a musical instrument, the person wants the sounds from the musical instrument to be included in the video or video stream. In another example, a user is interacting with a dog and wants the dog's barking to be included with the sound of the video being recorded, sent or streamed. In these examples, a noise canceller that filters out non-human sounds works to remove or cancel the non-human sounds even though a user desires these non-human sounds to be part of the video.

Techniques described herein provide noise cancellation for an electronic device that determines the salience of an object in the video and adjusts or adapts the noise canceller based on the object salience. For example, in video where a person is playing a musical instrument, techniques described herein determine that the musical instrument is salient to the video and modifies the noise canceller so that it does not cancel the sound of the musical instrument. If an object has salience, the electronic device uses the noise canceller to allow the sounds from the object to pass without being filtered out or canceled out of the audio portion of the video stream. If an object does not have salience, the electronic device uses the noise canceller to cancel the sounds from the object out of the audio portion of the video stream.

Throughout the drawings, similar reference numbers may designate similar or identical elements. When an element is referred to without a reference number, this may refer to the element generally, with or without limitation to any particular drawing or figure. In some examples, the drawings are not to scale, and the size of some parts may be exaggerated to more clearly illustrate the example shown. Moreover, the drawings provide examples in accordance with the description. The description is not limited to the examples provided in the drawings.

FIG. 1 is a diagram illustrating an example of noise cancellation for electronic devices. The electronic device 110 records video of a person 102 via a camera 108 connected to the electronic device 110. In some examples, the camera 108 is part of the electronic device 110. In other examples, the camera 108 is connected to the electronic device 110 via a wired or wireless connection. In further examples, the techniques described herein are part of the camera 108 itself. In other words, the camera 108 may be the electronic device 110.

The electronic device 110 performs noise cancellation on the video or video stream using a noise canceller, described below. In some examples, the noise canceller is an acoustic noise canceller. The electronic device 110 detects objects in view of the camera 108 and uses the noise canceller to cancel noise based on the object salience in the video. An object is any item in view of the camera 108, such as a person, a musical instrument, an animal, a device, etc. An object salience is how prominent the object is in the video stream. In other words, the saliency of the object is a determination of whether the object is to be the subject or one of the subjects of the video, or whether the object is simply in the background and is not intended to be the subject of the video. If an object has salience, the electronic device 110 uses the noise canceller to allow the sounds from the object to pass without being filtered out or canceled out of the audio portion of the video stream. If an object does not have salience, the electronic device 110 uses the noise canceller to cancel the sounds from the object out of the audio portion of the video stream.

In FIG. 1, the object in view of the camera 108 is a person 102. The person 102 has object salience because the person 102 is in front of the camera 108, is facing the camera 108, and no other objects are in view of the camera 108. In the context shown in FIG. 1, the electronic device 110 performs noise cancellation to allow a human voice to pass but sounds outside of the human voice range are canceled. In some examples, non-human sounds are cancelled. For example, a background sound such as a siren is canceled or filtered out of the audio of the video stream.

Figure 2A:
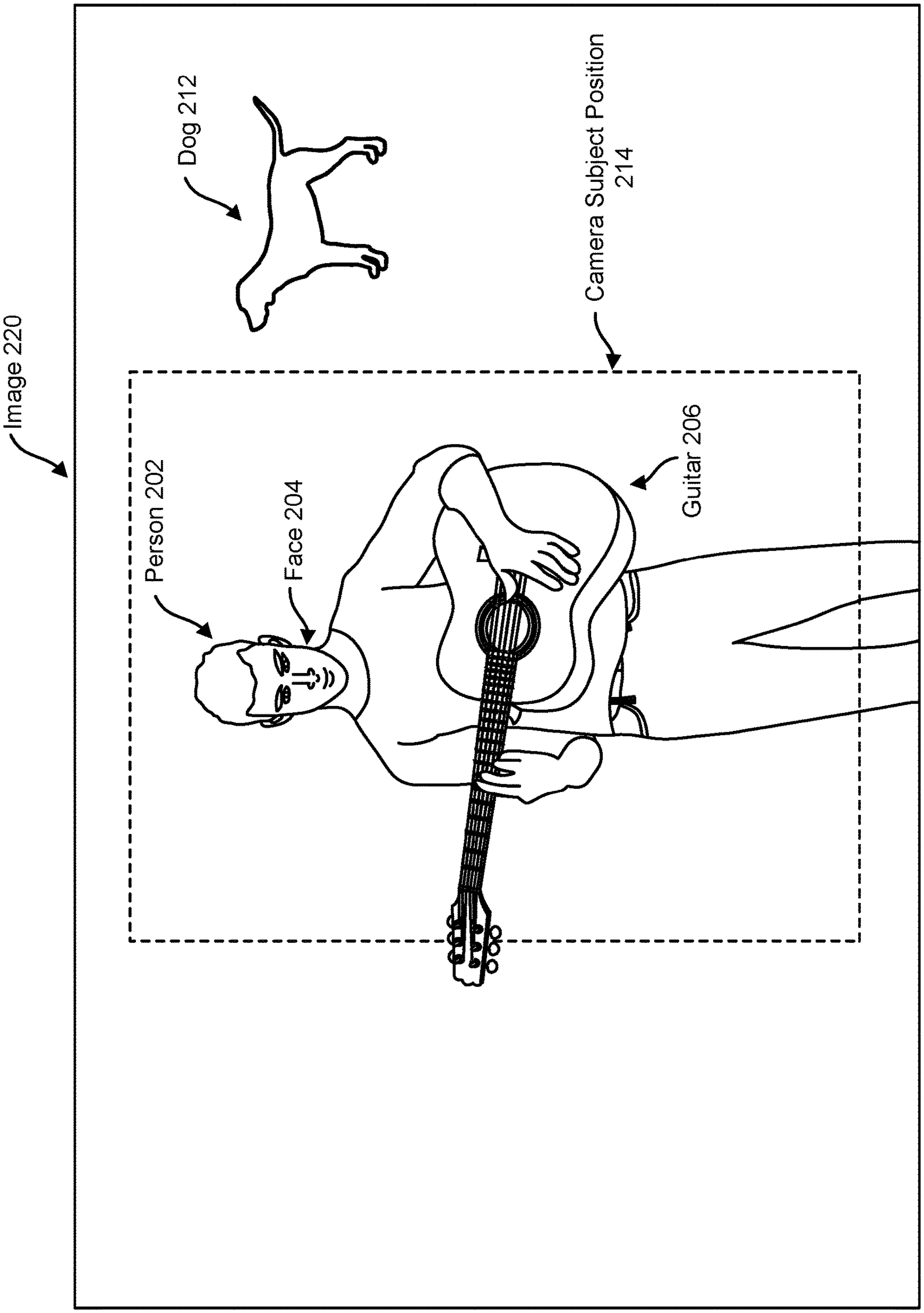
FIG. 2A is a diagram illustrating an example of a camera view from an electronic device performing noise cancellation.

FIG. 2A is a diagram illustrating an example of a camera view from an electronic device performing noise cancellation. In some examples, the camera view of FIG. 2A is provided by a webcam on the electronic device 110. A person 202 uses the electronic device 110 having a camera. The camera 108 captures an image 220 of the person 202 and the scene or environment around the person 202. In some examples, the image 220 is part of a video or video stream being provided by the camera 108.

The electronic device 110 analyzes the image 220 to identify objects in the image 220 and the salience of the objects. The electronic device 110 uses the object salience to select a noise canceller characteristic to be used in performing noise cancellation. In the image 220 shown in FIG. 2A, the electronic device 110 identifies three objects and determines that one object is a person 202, another object is a musical instrument (guitar 206), and the final object is an animal (dog 212). The electronic device 110 continues to analyze images 220 in the video stream to detect changes in object salience. The salience of an object may change while a video is being recorded or streamed.

The electronic device 110 uses several techniques to determine an object salience and to detect a change in the object salience. In some examples, determining an object salience includes determining an object is a musical instrument. For example, in FIG. 2A, the object the person 202 is holding is determined to be a musical instrument (guitar 206). In some examples, determining an object salience includes detecting a person 202 engaging with an object. For example, in FIG. 2A, the person 202 is engaging with the guitar 206. Because the person 202 is engaging with the guitar 206, the guitar 206 has object salience. The object salience may also be determined based on identifying an object between a person 202 and a camera 108. In FIG. 2A, for example, the guitar 206 is between the person 202 and the camera 108.

In some examples, determining an object salience includes detecting a position of an object. For example, in FIG. 2A, the person 202 is determined to be in a camera subject position 214, indicated by the dotted line. The camera subject position 214 may be defined by a user of the camera or may be determined by the camera 108 based on the camera focus. In further examples, determining an object salience includes detecting a face 204. For example, in FIG. 2A, the face 204 of the person 202 is detected. A detected face 204 indicates that the person 202 has salience. For example, if the person's face 204 was not shown or was not facing the camera 108, the person 202 has less object salience. Furthermore, if the person 202 moved out of the camera subject position 214, the person 202 would have less salience. More generally, detecting object salience includes detecting movement of an object to a camera subject position 214 or out of the camera subject position 214.

In FIG. 2A, the person 202 is salient and the guitar 206 is salient. The dog 212 does not have object salience because it is outside of the camera subject position 214 and because the person 202 is not interacting with or giving attention to the dog 212. With the objects identified and the objects' salience determined, the electronic device 110 selects a noise canceller characteristic to be used in performing noise cancellation. The noise canceller of FIG. 2A uses characteristics of passing a human voice and passing guitar 206 sounds, but cancels other sounds including the sounds of the dog 212, such as barking. The noise canceller adapts or is modified to allow the sounds of objects with salience to pass and to cancel the sounds of objects without salience. An object generates or makes sounds with audible characteristics. For example, audible characteristics include frequencies, frequency bands, duration, energy, language, etc. In some examples, the noise canceller is modified based on the audible characteristics of the objects in the image 220.

Figure 2B:
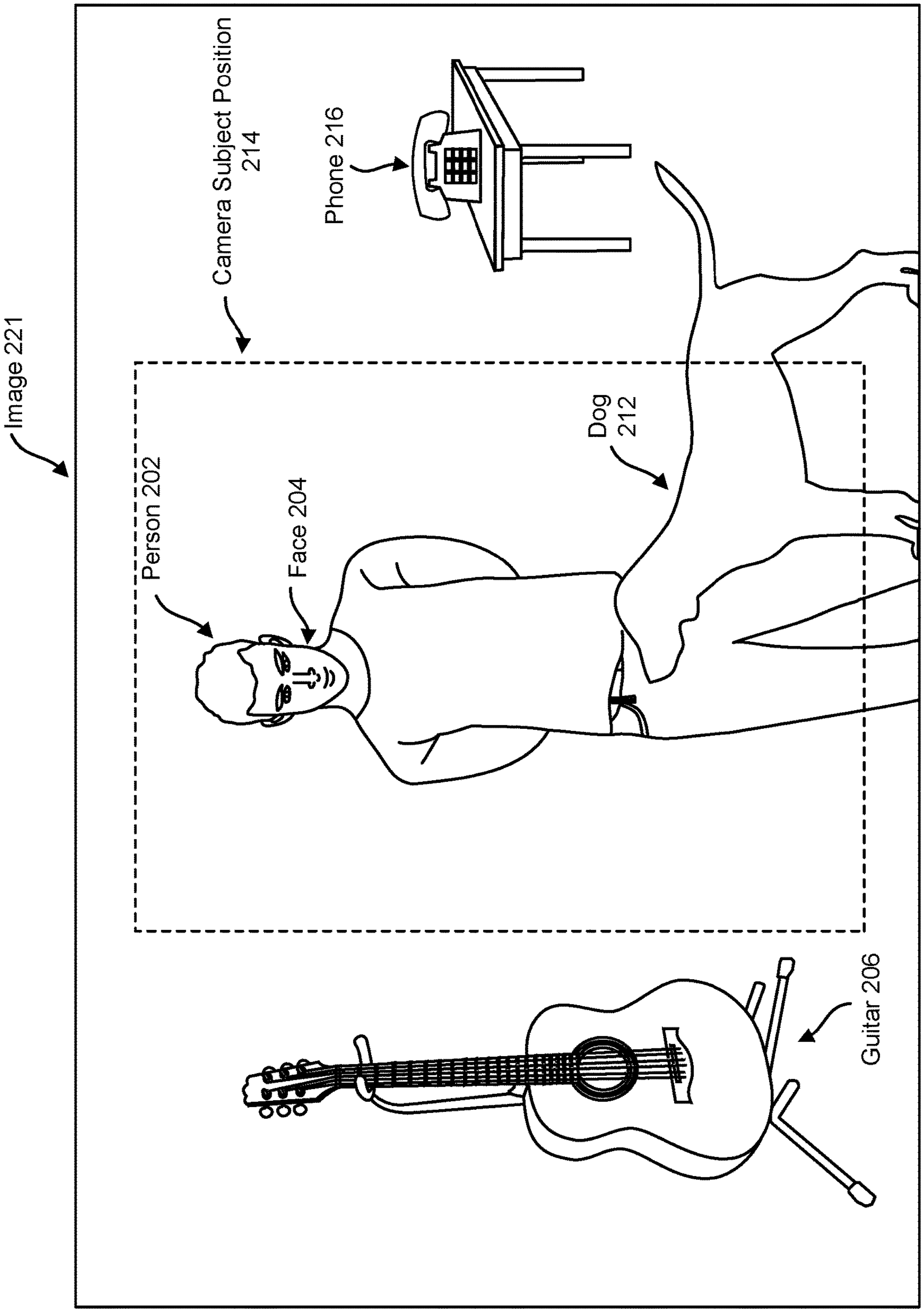
FIG. 2B is a diagram illustrating an example of a camera view from an electronic device performing noise cancellation.

FIG. 2B is a diagram illustrating an example of a camera view from an electronic device performing noise cancellation. The image 221 of FIG. 2B is an image from a video stream at a time later than the image 220 of FIG. 2A. The electronic device 110 detects changes in object salience in the video stream. FIG. 2B illustrates changes in object salience of the guitar 206, the dog 212, and a new object found in the image 221, a phone 216.

The electronic device 110 uses several techniques to detect a change in object salience. In some examples, detecting a change in object salience includes detecting motion relating to an object. For example, in FIG. 2B, the dog 212 has moved into the camera subject position 214 next to the person 202. Movement of an object to a camera subject position 214 indicates saliency. As a result, the dog 212 has object salience. In addition, the dog 212 is between the person 202 and the camera 108, which also indicates object salience. The electronic device 110 detects that the musical instrument, the guitar 206, has been moved out of the camera subject position 214, and further that the person 202 is no longer engaging with the musical instrument. The guitar 206 no longer has salience. A new object, a phone 216, is identified in the image 221. The electronic device 110 determines that the phone 216 does not have object salience. Several factors are considered to determine that the phone 216 does not have object salience including that the phone 216 is outside of the camera subject position 214, that the person 202 is not engaging with the phone 216, and that the phone 216 is not in between the person 202 and the camera 108.

With the objects identified and the objects' salience determined, the electronic device 110 selects noise canceller characteristics to be used in performing noise cancellation. The noise canceller of FIG. 2B uses characteristics of passing a human voice and passing the sounds of a dog, but cancels other sounds such as the sounds of the guitar 206 and the sounds of the phone 216.

If the person 202 moved out of the camera subject position 214 such that the dog 212 was the object with salience in the video, the electronic device 110 would begin cancelling human voice sounds and passing the sounds of a dog. Noise cancellation programmed to just allow human voice sounds may be disabled in such a scenario.

Figure 3:
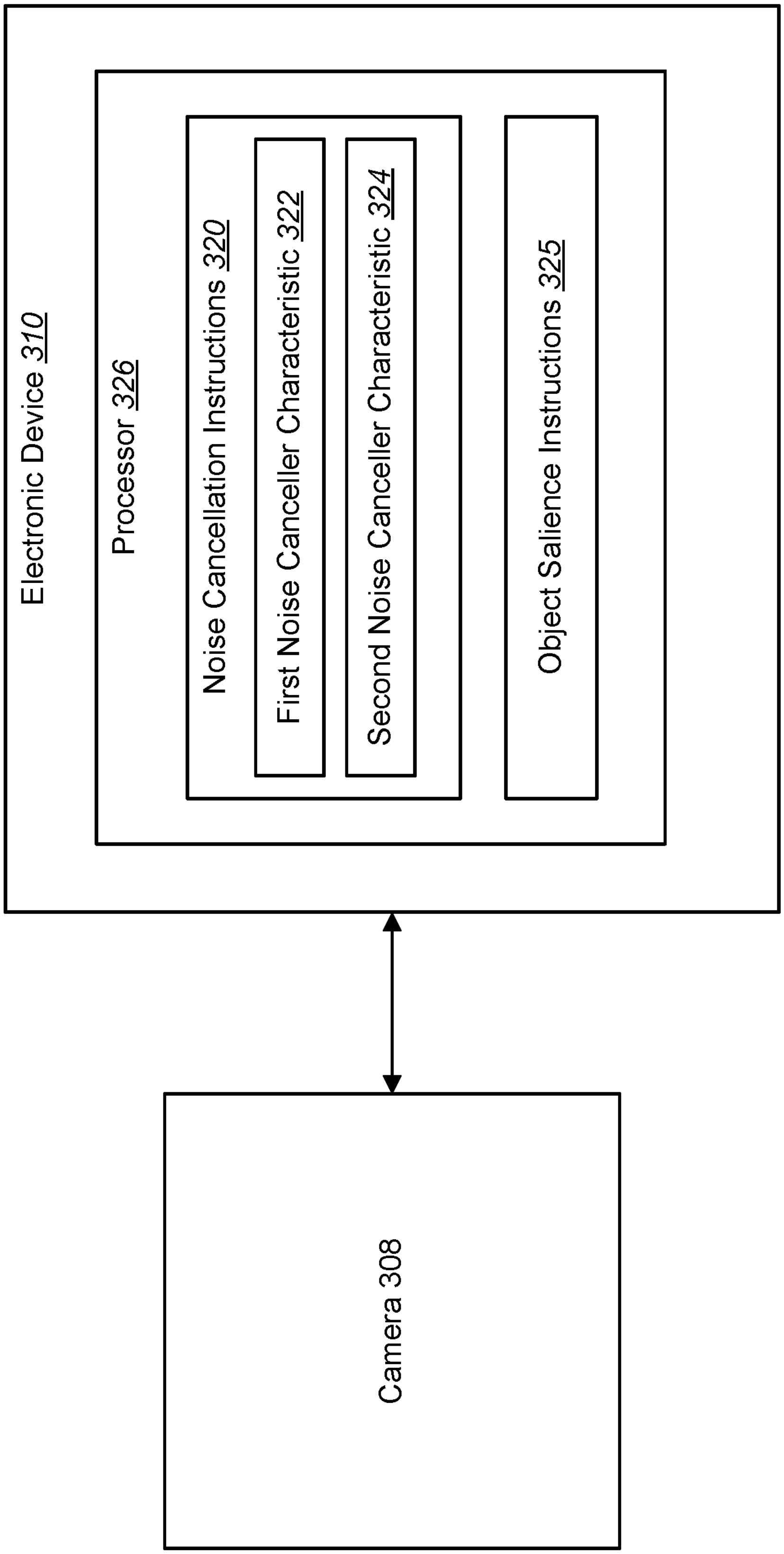
FIG. 3 is a block diagram illustrating an example of an electronic device for providing noise cancellation.

FIG. 3 is a block diagram illustrating an example of an electronic device 310 for providing noise cancellation. The electronic device 310 is an example of the electronic device 110 described in FIGS. 1, 2A, and 2B. The electronic device 310 includes a processor 326 in electronic communication with a camera 308. The camera 308 may be part of the electronic device 310 or it may be a separate component connected to or coupled with the processor 326 via a wired or wireless connection for electronic communication between the camera 308 and the processor 326.

The processor 326 executes noise cancellation instructions 320 causing the processor 326 to perform a first noise cancellation on a video stream using a first noise canceller characteristic 322. The video stream is provided to the electronic device 310 from the camera 308. The processor 326 executes object salience instructions 325 causing the processor 326 to detect a change in an object salience in the video stream. Based on a change in the object salience, the processor 326 executes the noise cancellation instructions 320 causing the processor 326 to perform a second noise cancellation on the video stream using a second noise canceller characteristic 324. In some examples, a noise canceller characteristic is a frequency, frequency band, or sets of frequency bands.

An electronic device 310 is a device that includes electronic circuitry (e.g., integrated circuitry). Examples of electronic devices may include computing devices (e.g., laptop computers, desktop computers, all-in-one computers, tablet devices, etc.), smartphones, game consoles, game controllers, smart appliances, printing devices, vehicles with electronic components, aircraft, drones, robots, smart appliances, etc.

In some examples, electronic devices 310 utilize circuitry (e.g., controller(s), processor(s), etc., or a combination thereof) to perform an operation. In some examples, electronic devices 310 execute instructions stored in memory to perform the operation(s). Instructions may be code, programming, or a combination thereof that specifies functionality or operation of the circuitry. In some examples, different circuitries in an electronic device 310 store or utilize separate instructions for operation. Portions of the electronic device 310 are coupled or connected via an interface (e.g., bus(es), wire(s), connector(s), etc.). For example, portions of the electronic device 310 or circuitries of the electronic device 310 may be coupled via an inter-integrated circuit (I2C) interface. The portions or circuitries may communicate via the interface.

The processor 326 executes instructions or code to perform operations on the electronic device 310. The processor 326 may be any of a microcontroller (e.g., embedded controller), a central processing unit (CPU), a semiconductor-based microprocessor, a general-purpose processor, graphics processing unit (GPU), field-programmable gate array (FPGA), an application-specific integrated circuit (ASIC), a circuit, a chipset, and/or other hardware device suitable for retrieval and execution of instructions stored in a memory (not shown). While a single processor 326 is shown in FIG. 3, in other examples, the processor 326 may include multiple processors (e.g., a CPU and a GPU).

The electronic device 310 may include additional portions (e.g., components, circuitries, etc.) (not shown) or some of the portions described herein may be removed or modified without departing from the scope of this disclosure. In some examples, the electronic device 310 may include input/output (I/O) circuitry (e.g., port(s), interface circuitry, etc.), memory circuitry, input device(s), output device(s), etc., or a combination thereof.

Figure 4:
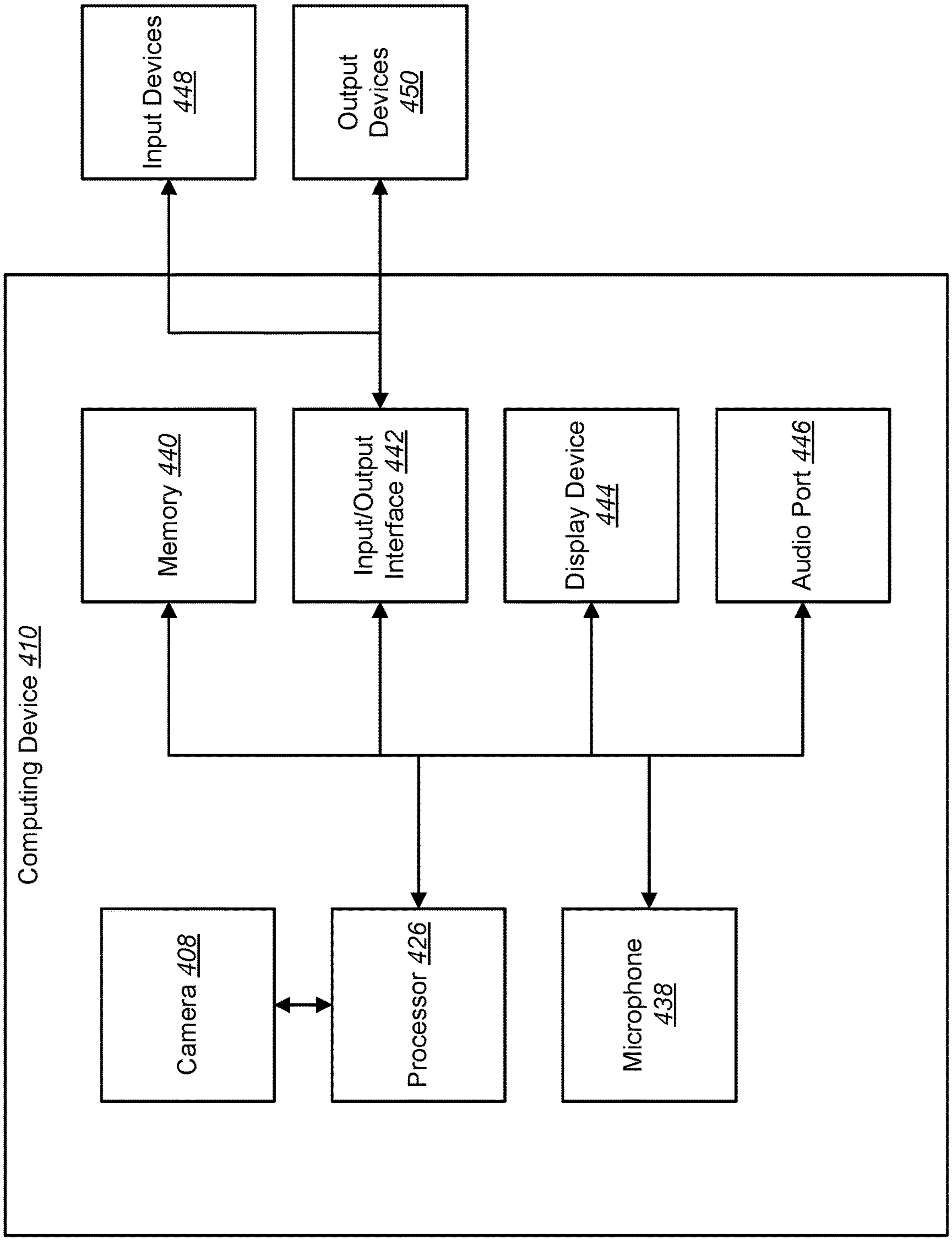
FIG. 4 is a block diagram illustrating an example of a computing device for providing noise cancellation.

FIG. 4 is a block diagram illustrating an example of a computing device 410 for providing noise cancellation. In some examples, the computing device 410 may perform an aspect of the operations described in FIGS. 1-3. The computing device 410 may be an example of the electronic devices 110, 310 described in FIGS. 1-3. In some examples, the computing device 410 includes a processor 426 in communication with memory 440, a display device 444, a camera 408, a microphone 438, an audio port 446, and an input/output interface 442. In some examples, portions of the computing device 410 are coupled via an interface (e.g., bus(es), wire(s), connector(s), etc.). Examples of the computing device 410 include a desktop computer, laptop computer, tablet device, smartphone, mobile device, etc. In some examples, one, some, or all of the components or elements of the computing device 410 may be structured in hardware or circuitry. In some examples, the computing device 410 may perform one, some, or all of the operations described in FIGS. 1-7.

The computing device 410 is coupled to or is in electronic communication with the camera 408 to receive a video or video stream from the camera 408. In some examples, the camera 408 may be integrated with the computing device 410. For example, in the case of a laptop computer, a tablet computer, or a smartphone, the camera 408 may be built into the computing device 410. In other examples, the camera 408 may be separate from the computing device 410 but may communicate with the computing device 410. For example, an external webcam may be connected to the computing device 410.

The camera 408 may be positioned to view a person 102 at the computing device 410. For example, the camera 408 of a laptop computer may view a person 102 when the case of the laptop computer is open. In this scenario, the camera 408 may be located in a frame of the case housing of the display device 444 of the laptop computer. In other examples, the camera 408 may be a front-facing camera of a tablet computer or smartphone. In yet other examples, the camera 408 may be a webcam or other external camera.

The computing device 410 receives a video stream from the camera 408 and detects whether there has been a change in object salience in the video stream. In some examples, the computing device 410 modifies an acoustic noise canceller based on a change in an object salience in the video stream and performs acoustic noise cancellation on the video stream using the modified acoustic noise canceller. In some examples, modifying the acoustic noise canceller based on the change in the object salience includes automatically modifying the acoustic noise canceller without any user input.

The computing device 410 modifies the acoustic noise canceller to cancel sounds from objects without salience and to pass sounds from objects with salience, as described herein. For example, modifying the acoustic noise canceller based on the change in the object salience includes modifying the acoustic noise canceller to pass or to cancel a frequency band of the object. In some examples, the frequency band of a human voice may be characterized as a band from 80 hertz (Hz) to 8 kilohertz (kHz).

In some examples, when an object transitions from not having salience to having object salience, the computing device 410 modifies the acoustic noise canceller from rejecting a frequency band of the object to passing the frequency band of the object. If the object then transitions from having salience to not having salience, the computing device 410 modifies the acoustic noise canceller to cancel a frequency band of the object.

In some examples, input devices 448 and output devices 450 are used with the computing device 410. An audio port 446 is included on the computing device 410. One example of an audio port 446 is a headphone jack. The computing device 410 also includes a microphone 438. In some examples, the microphone 438 records the audio or sound to be combined with the video taken by the camera 408. In other examples, the microphone 438 is combined and included with the camera 408.

The processor 426 executes instructions on the computing device 410 to perform an operation (e.g., execute application (s)). For instance, the processor 426 may be an example of the processor 326 described in FIG. 3. In other examples, the processor 426 may be a processor from the AMD architecture or a processor from the Intel architecture. The processor 426 is in electronic communication with the memory 440 via a memory communications bus.

In some examples, the memory 440 includes memory circuitry. The memory circuitry may be electronic, magnetic, optical, or other physical storage device(s) that contains or stores electronic information (e.g., instructions, data, or a combination thereof). In some examples, the memory circuitry stores instructions for execution (by the processor 426, or other component(s) of the computing device 410, or a combination thereof). The memory circuitry may be integrated into or separate from the element(s) described in FIG. 4. The memory circuitry may be, for example, Random Access Memory (RAM), Electrically Erasable Programmable Read-Only Memory (EEPROM), storage device(s), optical disc(s), or the like. In some examples, the memory circuitry may be volatile memory, non-volatile memory, or a combination thereof. Examples of memory circuitry may include Dynamic Random Access Memory (DRAM), EEPROM, magnetoresistive random-access memory (MRAM), phase change RAM (PCRAM), memristor, flash memory, or the like. In some examples, the memory circuitry may be non-transitory tangible machine-readable or computer-readable storage media, where the term "non-transitory" does not encompass transitory propagating signals.

The computing device 410 includes a user interface. A user interface includes input devices 448 and output devices 450. Examples of output devices 450 include a display device 444, speaker(s), headphone(s), etc. The display device 444 may be referred to as a monitor, touchscreen, screen, or display of the computing device 410. In some examples, the display device 444 includes circuitry and/or instructions for presenting information to a user. In some examples, a display device 444 is attached to or may be external from the computing device 410. Some examples of technologies used by the display device 444 include an electroluminescent (ELD) display, a liquid crystal display (LCD), light-emitting diode (LED) backlit LCD, thin-film transistor (TFT) LCD, light-emitting diode (LED) display (e.g., organic light-emitting diode (OLED)), active-matrix LED (AMOLED) display, plasma (PDP) display, and/or quantum dot (QLED) display.

The user interface also includes input devices 448. Examples of input devices 448 include a keyboard, a mouse, a touch screen, joystick, camera 408, microphone 438, etc. The input/output interface 442 provides an interface between the processor 426 and the input devices 448 and output devices 450. For example, the input/output interface 442 may be a Universal Serial Bus (USB) port for a keyboard or a mouse. In another example, the input/output interface 442 may be a video card for an external display device 444. In some examples, the video or video stream is displayed or presented to the person 102 through the user interface.

Figure 5:
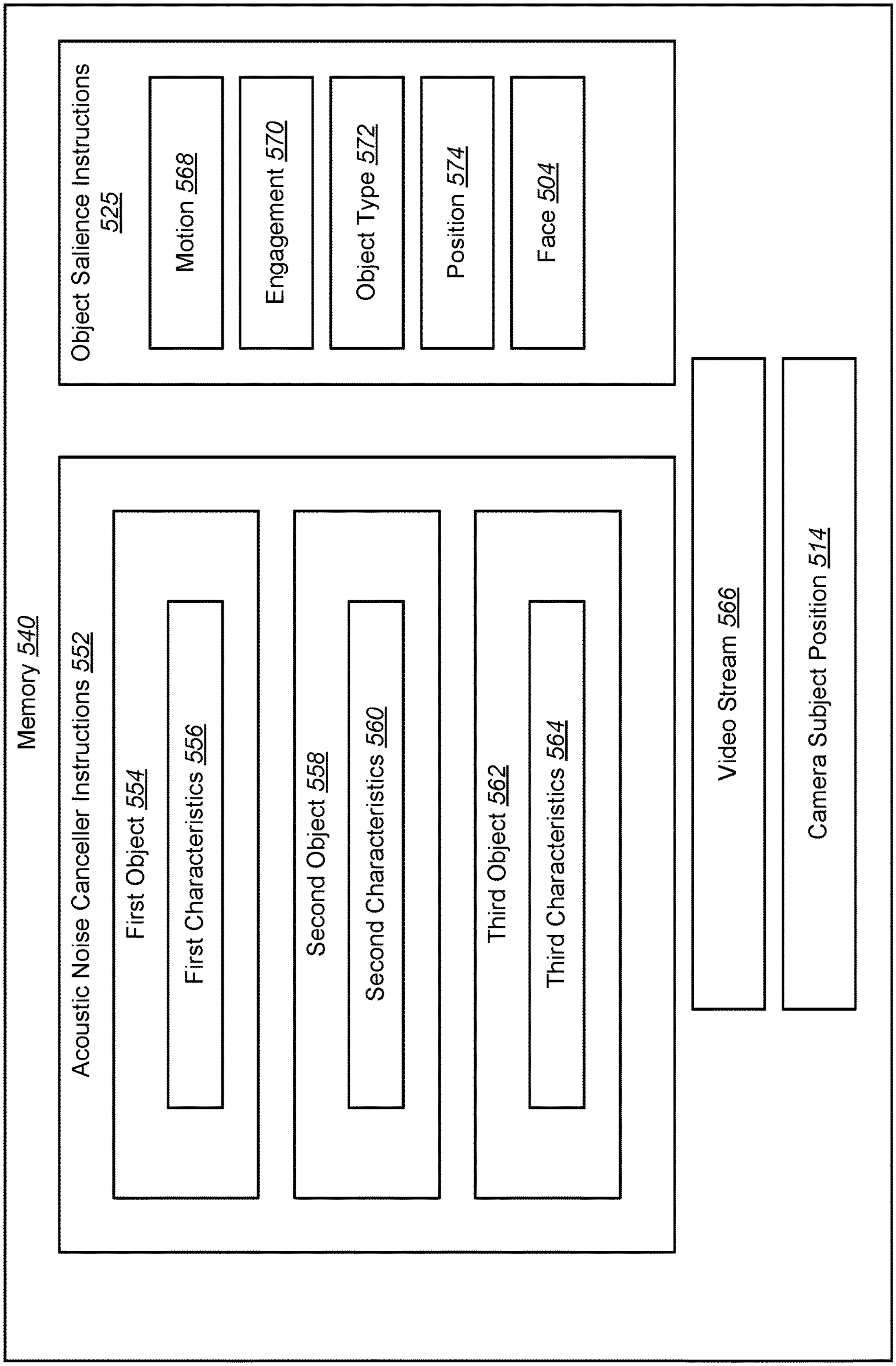
FIG. 5 is a block diagram illustrating an example of memory for a computing device for providing noise cancellation.

FIG. 5 is a block diagram illustrating an example of memory 540 for a computing device 410 for performing noise cancellation. The memory 540 is an example of the memory 440 described in FIG. 4. The instructions are executable by the processor 426 and are examples of instructions and operations described in FIGS. 1-4.

In some examples, the acoustic noise canceller instructions 552 are instructions that when executed cause the processor 426 to perform acoustic noise cancellation on the video stream 566. Based on object salience, the processor 426 modifies the acoustic noise canceller instructions 552 to cancel sounds from objects without salience and to pass sounds from objects with salience. In some examples, the processor 426 modifies the acoustic noise canceller instructions 552 based on a change in object salience. The acoustic noise canceller instructions 552 are modified based on the audible characteristics of objects with salience or based on the audible characteristics of objects without salience or a combination thereof. For example, the first object 554 includes first object audible characteristics 556, such as frequencies, frequency bands, duration, energy, language, etc. The second object 558 includes second object audible characteristics 560, and the third object 562 includes third object audible characteristics 564. Three objects with corresponding audible characteristics are shown in FIG. 5. However, the acoustic noise canceller instructions 552 may store as many different sets of objects and audible characteristics as needed. By way of example, the first object 554 may be a person with audible characteristics of a person's voice, the second object 558 may be a dog with audible characteristics of the sounds of a dog, and the third object 562 may be a guitar with audible characteristics of a guitar. Depending on which object has salience, the acoustic noise canceller instructions 552 use the object's audible characteristics to modify the acoustic noise cancelling being performed to pass the sounds of the objects with salience and to cancel or reject the sounds of the objects without salience.

In some examples, the object salience instructions 525 are instructions that when executed cause the processor 426 to determine the salience of an object. Different techniques are described herein to determine the salience of an object. In some examples, motion 568 relating to an object is used in determining the object salience. For example, whether the object is moving into the camera subject position 514 or away from the camera subject position 514. Engagement 570 or interaction between objects is also analyzed in determining object salience. For example, if a person is in the camera subject position 514, whether the person 102 is engaging with or interacting with another object is used to determine other object's salience. The type 572 of object is also considered in determining object saliency. For example, whether the object is a musical instrument, an animal, another person, an electronic device 110, etc., is a factor in determining the object salience. In some examples, the position 574 of the object is used to determine the object's salience. In further examples, face detection is used to determine the object's salience. For example, if the object is a person, whether the person's face 504 is visible to the camera 108 is a factor in determining the person's salience. Whether the person is talking, including talking to another person or on a phone, is another factor in determining the person's salience.

Figure 6:
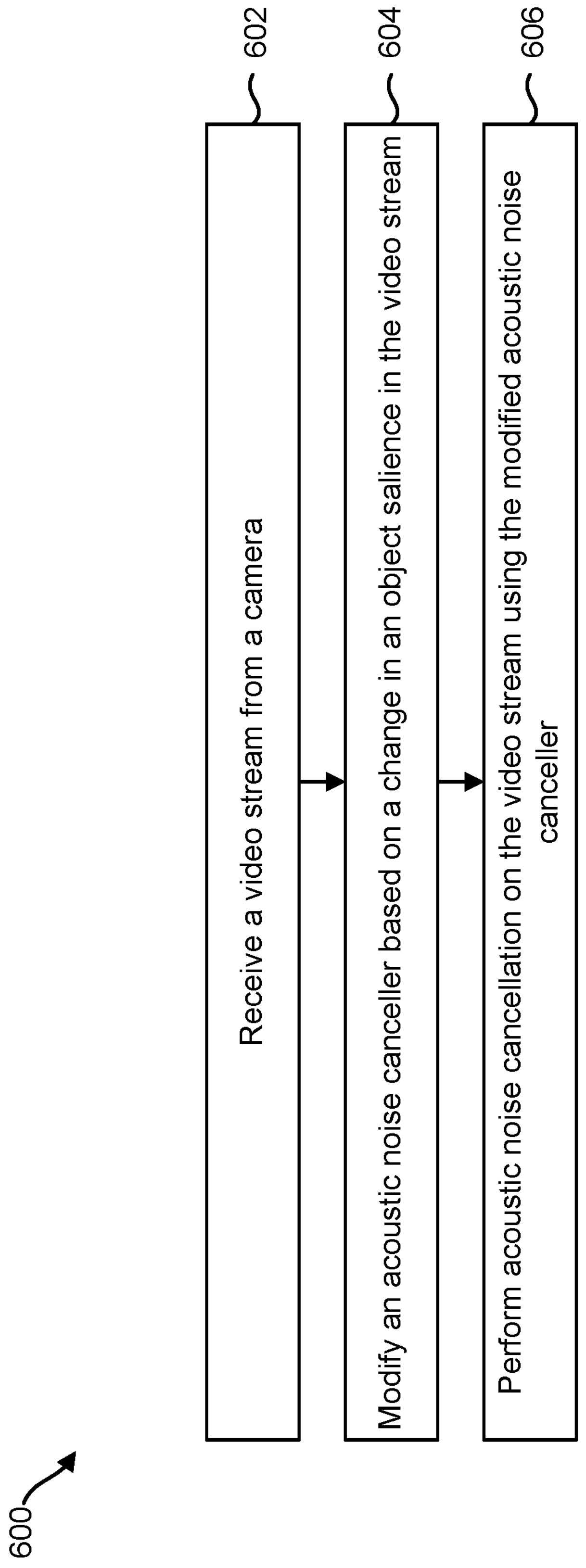
FIG. 6 is a flow diagram illustrating an example of a method for providing noise cancellation for electronic devices.

FIG. 6 is a flow diagram illustrating an example of a method 600 for providing noise cancellation for electronic devices (110, 310). The method 600 or a method 600 element(s) is performed by an electronic device, computing device or apparatus (e.g., electronic device, apparatus, desktop computer, laptop computer, smartphone, tablet device, etc.). For example, the method 600 is performed by the electronic device 310 described in FIG. 3 or by the computing device 410 described in FIG. 4.

At 602, the electronic device 110 receives a video stream from a camera. At 604, the electronic device 110 modifies an acoustic noise canceller based on a change in an object salience in the video stream 566. The various techniques described herein for determining object salience and detecting a change in object salience may be used. In some examples, modifying the acoustic noise canceller based on a change in an object salience is done automatically. At 606, the electronic device 110 performs acoustic noise cancellation on the video stream 566 using the modified acoustic noise canceller.

Figure 7:
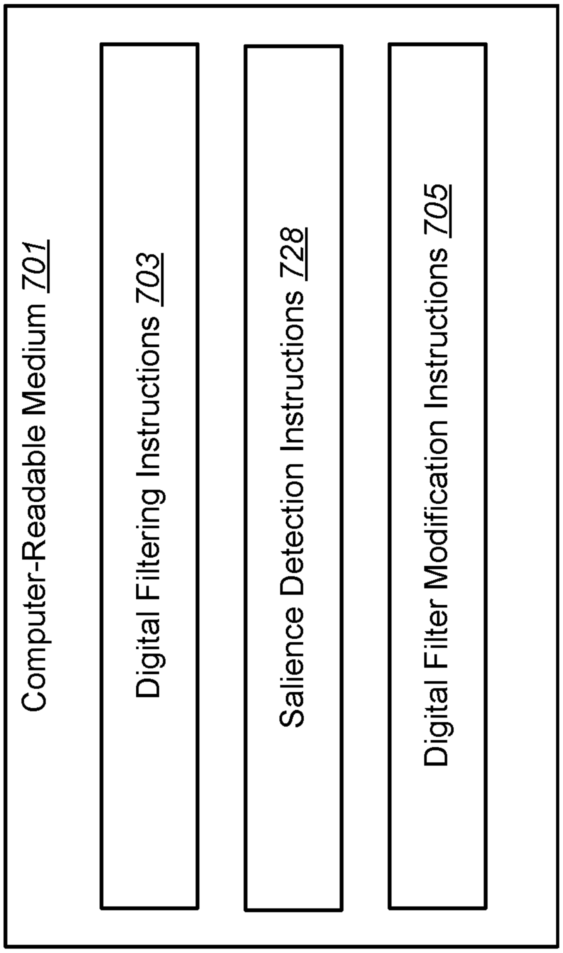
FIG. 7 is a block diagram illustrating an example of a computer-readable medium to provide noise cancellation for electronic devices.

FIG. 7 is a block diagram illustrating an example of a computer-readable medium 701 to provide noise cancellation for electronic devices (110, 310). The computer-readable medium 701 is a non-transitory, tangible computer-readable medium 701. The computer-readable medium 701 may be, for example, RAM, EEPROM, a storage device, an optical disc, and the like. In some examples, the computer-readable medium 701 may be volatile and/or non-volatile memory, such as DRAM, EEPROM, MRAM, PCRAM, memristor, flash memory, and the like. In some examples, the computer-readable medium 701 described in FIG. 7 may be an example of memory for an electronic device 310 or a computing device 410 described herein. In some examples, code (e.g., data and/or executable code or instructions) of the computer-readable medium 701 may be transferred and/or loaded to memory or memories of the electronic device 310 or the computing device 410.

The computer-readable medium 701 includes code (e.g., data and/or executable code or instructions). For example, the computer-readable medium 701 includes digital filtering instructions 703, salience detection instructions 728, and digital filter modification instructions 705.

In some examples, the digital filtering instructions 703 are instructions that when executed cause the processor 326 of the electronic device 310 to filter video using a digital filter. The digital filter performs noise cancellation on the video.

In some examples, the salience detection instructions 728 are instructions that when executed cause the processor 326 of the electronic device 310 to determine the salience of an object in the video. Further, the salience detection instructions 728 are instructions that when executed cause the processor 326 of the electronic device 310 to detect a change in a salience of an object in the video.

In some examples, the digital filter modification instructions 705 are instructions that when executed cause the processor 326 of the electronic device 310 to modify the digital filter based on an audible characteristic of an object in the video. Modifying the digital filter based on an audible characteristic of an object provides a modified digital filter. Modifying the digital filter based on the audible characteristic of the object includes modifying the digital filter to pass the audible characteristic of the object and modifying the digital filter to cancel the audible characteristic of the object. If the object with the audible characteristic has object salience, the modified digital filter passes the audible characteristic of the object. If the object with the audible characteristic does not have object salience, the modified digital filter cancels the audible characteristic of the object.

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operation(s), aspect(s), or element(s) of the examples described herein may be omitted or combined.

The invention claimed is:

1. An electronic device, comprising:

a processor to:

perform a first noise cancellation on a video stream using a first noise canceller characteristic;

detect a change in salience of a visual object within the video stream; and perform a second noise cancellation on the video stream using a second noise canceller characteristic based on the change in the object salience, the second noise canceller characteristic differing from the first noise canceller characteristic in whether a frequency band associated with the visual object is passed or cancelled.

2. The electronic device of claim 1, wherein detecting the change in the object salience comprises detecting motion relating to an object.

3. The electronic device of claim 1, wherein detecting the change in the object salience comprises detecting a person engaging with an object.

4. The electronic device of claim 1, wherein detecting the change in the object salience comprises determining an object is a musical instrument.

5. The electronic device of claim 1, wherein detecting the change in the object salience comprises identifying an object between a person and a camera.

6. The electronic device of claim 1, wherein detecting the change in the object salience comprises detecting a position of a person.

7. The electronic device of claim 1, wherein detecting the change in the object salience comprises detecting a face.

8. A computing device, comprising:

a camera; and a processor to:

receive a video stream from the camera;

modify an acoustic noise canceller based on a change in salience of an object depicted within the video stream, wherein modifying the acoustic noise canceller comprises switching whether a frequency band associated with the object is passed or cancelled; and perform acoustic noise cancellation on the video stream using the modified acoustic noise canceller.

9. The computing device of claim 8, wherein the change in the object salience comprises detecting an object at a camera subject position.

10. The computing device of claim 8, wherein switching whether the frequency band associated with the object is passed or cancelled comprises switching from cancelling the frequency band to passing the frequency band when the object transitions from not having salience to having salience.

11. The computing device of claim 8, wherein switching whether the frequency band associated with the object is passed or cancelled comprises switching from passing the frequency band to cancelling the frequency band when the object transitions from having salience to not having salience.

12. The computing device of claim 8, wherein modifying the acoustic noise canceller based on the change in the object salience comprises modifying the acoustic noise canceller based on an audible characteristic of an object.

13. A non-transitory tangible computer-readable medium comprising instructions that when executed cause a processor of an electronic device to:

filter video using a digital filter;

detect a change in a salience of an object depicted in the video in real time;

modify the digital filter based on an audible characteristic of the object, wherein modifying the digital filter comprises switching whether a frequency band associated with the object is passed or cancelled; and filter an audio portion of the video using the modified digital filter.

14. The non-transitory tangible computer-readable medium of claim 13, wherein switching whether the frequency band associated with the object is passed or cancelled comprises switching from cancelling the frequency band to passing the frequency band when the object transitions from not having salience to having salience.

15. The non-transitory tangible computer-readable medium of claim 13, wherein modifying the digital filter based on the audible characteristic of the object further comprises modifying the digital filter to pass non-human sounds.

16. The computing device of claim 8, wherein modifying the acoustic noise canceller based on the change in the object salience is performed automatically without a user input.

17. The computing device of claim 8, wherein the change in the object salience comprises detecting that an object has moved into a camera subject position.

18. The computing device of claim 8, wherein modifying the acoustic noise canceller further comprises selecting a first set of audible characteristics to pass for a first object determined to have salience and selecting a different second set of audible characteristics to pass for a second object determined to have salience at a later time in the video stream.

19. The non-transitory tangible computer-readable medium of claim 13, wherein modifying the digital filter further comprises passing an audible characteristic of a first object determined to have salience and canceling an audible characteristic of a second object determined not to have salience.

20. The non-transitory tangible computer-readable medium of claim 13, wherein detecting the change in the object salience comprises determining that the object is salient based on a combination of detection of a face of a person, detection that the object is between the person and a camera, and detection that the person is engaging with the object.

* * * * *